J. W. SHARP.
COTTON PLANTER AND FERTILIZER DISTRIBUTER.
APPLICATION FILED OCT. 28, 1911.
1,025,022.
Patented Apr. 30, 1912.
2 SHEETS—SHEET 1.
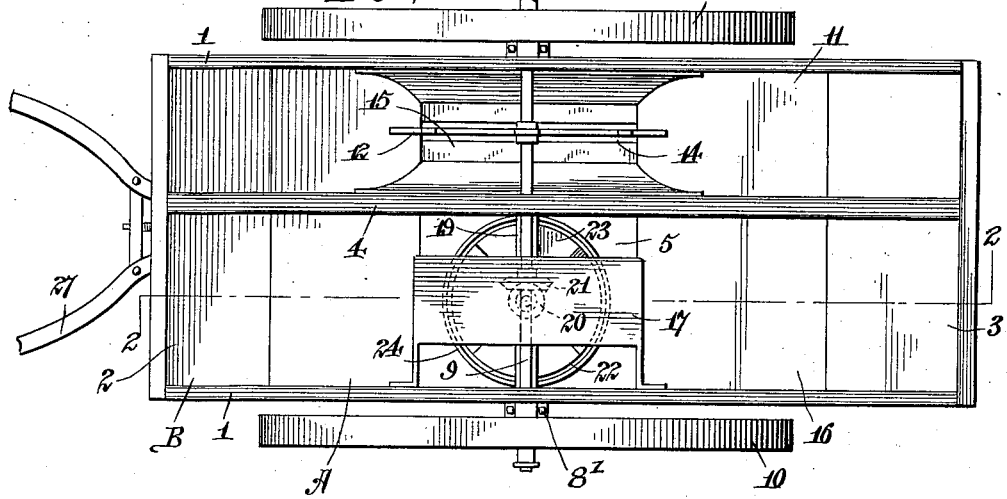
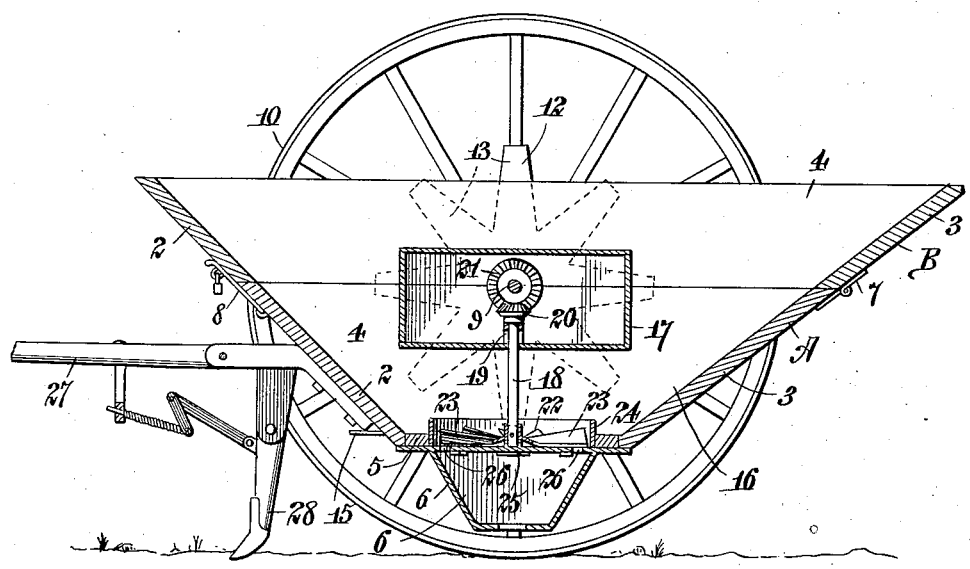
Witnesses:
Christ Feinle, Jr.
Inventor,
John W. Sharp.
By Victor J. Evans,
Attorney.

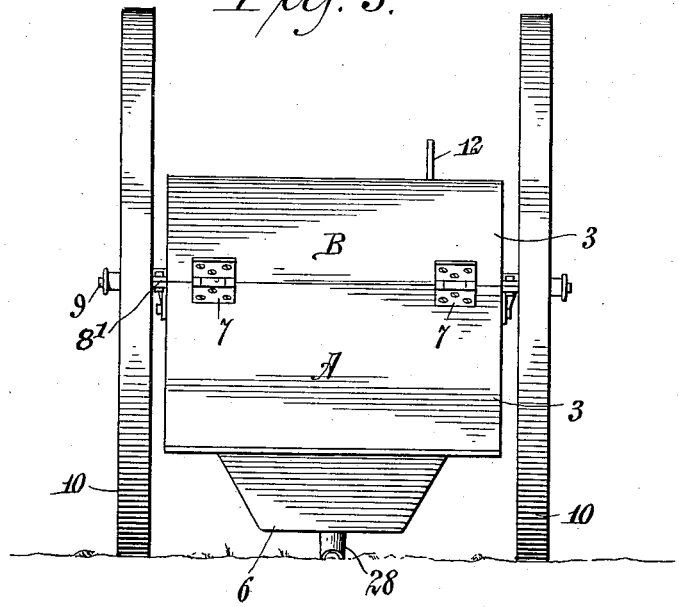
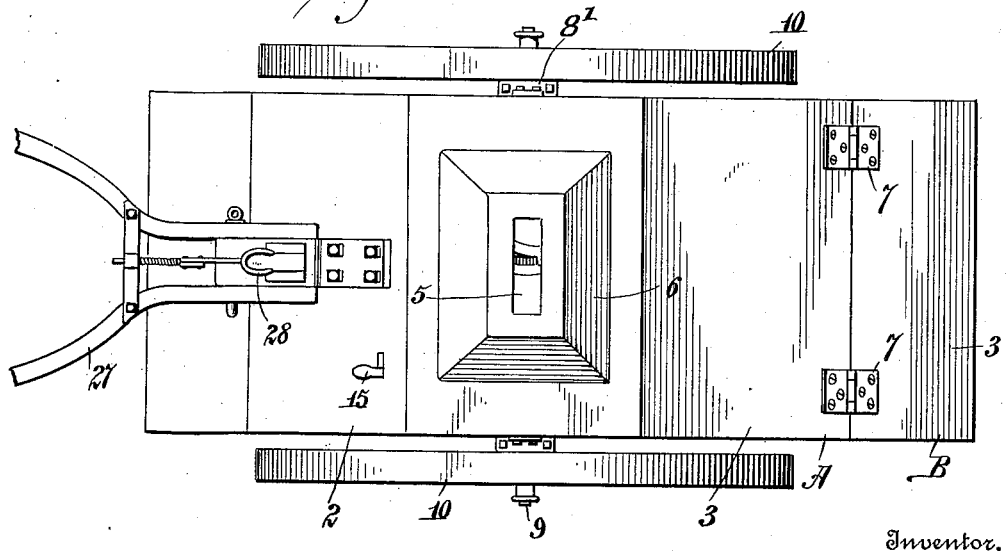

UNITED STATES PATENT OFFICE.

JOHN W. SHARP, OF KENYON, ARKANSAS.

COTTON-PLANTER AND FERTILIZER-DISTRIBUTER.

1,025,022.  Specification of Letters Patent.  Patented Apr. 30, 1912.

Application filed October 28, 1911. Serial No. 657,238.

*To all whom it may concern:*

Be it known that I, JOHN W. SHARP, a citizen of the United States, residing at Kenyon, in the county of Jackson and State of Arkansas, have invented new and useful Improvements in Cotton-Planters and Fertilizer-Distributers, of which the following is a specification.

This invention relates to cotton seed planters and fertilizer distributers, and it has for its object to produce a simple and efficient device whereby cotton seed and fertilizing material may be simultaneously deposited in the ground.

A further object of the invention is to simplify and improve the specific construction of the mechanism for distributing the fertilizing material.

With these and other ends in view which will readily appear as the nature of the invention is better understood, the same consists in the improved construction and novel arrangement and combination of parts which will be hereinafter fully described and particularly pointed out in the claims.

In the drawings,—Figure 1 is a top plan view of the machine constructed in accordance with the invention. Fig. 2 is a longitudinal sectional view of the same taken through the fertilizer distributing compartment on the line 2—2 in Fig. 1. Fig. 3 is a rear elevation. Fig. 4 is a bottom plan view.

Corresponding parts in the several figures are denoted by like characters of reference.

The hopper casing A of the improved machine is composed of the side walls 1, 1, front and rear end walls 2, 3 and a longitudinal partition 4. The front and rear end walls converge downwardly and terminate adjacent to the bottom member 5 which supports a discharge chute 6. The hopper casing supports an extension frame B which is suitably connected therewith by means of hinge members 7 and a clasp 8. The side members 1 of the hopper casing are provided with boxes or bearings 8' for the shaft or axle 9 having transporting wheels 10, said shaft carrying within the seed compartment 11 of the hopper casing a distributing wheel 12 and agitating arms 13. The bottom of the seed compartment communicates through an aperture 14 in the bottom member 5 with the discharge chute. Regulating slides 15 are provided for the purpose of gaging the escape of seed through the opening 14.

Suitably supported upon one of the side walls of the hopper casing within the fertilizer compartment 16 is a gear casing 17 which affords bearings for a vertically disposed shaft 18, the upper end of which has an additional bearing in a cross bar 19 extending across the fertilizer compartment from the side wall 1 to the longitudinal partition 4. The shaft 18 has a bevel pinion 20 meshing with a bevel gear 21 upon the shaft or axle 9 from which motion will thus be transmitted to the shaft 18. The latter carries at its lower end a distributing wheel 22 having a circumferential series of obliquely disposed blades 23, said distributing wheel or disk being disposed within a cylindrical casing 24 which is open at the top and which extends through the bottom member 5. The bottom 25 of the casing 24 is provided with one or more apertures 26 of suitable size for the escape of the fertilizing material which is thereby conducted to the discharge chute through which it is conducted to the ground, together with the seed. A draft frame 27 which is suitably associated with the hopper casing is equipped with a furrow opener 28. A suitable gathering or covering device may be provided when desired.

From the foregoing description, it will be seen that a simple and effective device has been provided whereby cotton seed and fertilizing material may be simultaneously deposited in a furrow which has been opened for the reception thereof. The fertilizing material particularly will be ground and loosened by the action of the distributing wheel or disk, the flukes or blades of which will cut the material from the bottom of the compartment and convey the same in loose or powder form to the bottom of the casing 24 through which it escapes. Caking and non-feeding of the fertilizing material is thus rendered practically impossible.

Having thus described the invention, what is claimed as new, is:—

1. A hopper casing having a seed compartment and a fertilizer compartment, a transverse wheel carrying axle, a gear casing in the fertilizer compartment, a vertical shaft supported for rotation in the gear casing and deriving motion from the wheel carrying axle, a feed disk upon the vertical shaft having obliquely disposed blades, and a casing open at the top and extending through the bottom of the fertilizer compartment in which the distributing disk operates, said casing having a discharge opening in the bottom thereof.

2. In a device of the character described, a hopper casing having a longitudinal partition, a top extension frame hingedly connected with said hopper frame and also having a longitudinal partition, a wheel carrying axle supported for rotation between the hopper casing and the extension frame, a cross brace connecting the longitudinal partition of the extension frame with one of the side walls of said frame, a gear casing in one of the compartments of the hopper casing, a shaft supported for rotation in the gear casing and in the transverse brace of the extension frame, a feed disk on said shaft, and means for transmitting motion from the axle to the vertical shaft.

3. In a device of the character described, a hopper casing having a bottom member, a feed casing supported by and extending through said bottom member, said casing having an open top and an apertured bottom, a feed disk operating in the feed casing and having a vertically disposed shaft, a wheel carrying axle, and means for transmitting motion from the latter to the feed disk carrying shaft.

In testimony whereof I affix my signature in presence of two witnesses.

JOHN W. X SHARP.
(his mark)

Witnesses:
DAN BARNETT,
C. D. JOHNSON.

---

Copies of this patent may be obtained for five cents each, by addressing the "Commissioner of Patents, Washington, D. C."